(12) United States Patent
Goldman

(10) Patent No.: US 6,438,957 B1
(45) Date of Patent: Aug. 27, 2002

(54) PIEZOELECTRIC POWER GENERATING ARRANGEMENT ACTIVATED BY ELEMENTS CAUSED TO ROTATE BY NATURAL ENERGY SOURCE

(76) Inventor: James A. Goldman, 43 Crosby Ave., Paterson, NJ (US) 07502

( * ) Notice: Subject to any disclaimer, the term of this patent is extended or adjusted under 35 U.S.C. 154(b) by 0 days.

(21) Appl. No.: 09/865,765

(22) Filed: May 25, 2001

(51) Int. Cl.[7] .............................................. B60K 16/00
(52) U.S. Cl. .................. 60/641.8; 60/641.5; 60/641.1
(58) Field of Search ........................... 60/641.1, 641.8, 60/641.11, 641.15

(56) References Cited

U.S. PATENT DOCUMENTS

| | | |
|---|---|---|
| 3,364,746 A | 1/1968 | Misauskas |
| 3,964,264 A * | 6/1976 | Tornabene ................ 61/20 |
| 4,006,594 A | 2/1977 | Horton |
| 4,039,848 A * | 8/1977 | Winderl ................... 290/55 |
| 4,055,956 A | 11/1977 | Matovich, Jr. |
| 4,138,997 A * | 2/1979 | LaPorte et al. ........... 126/271 |
| 4,223,666 A | 9/1980 | Wasserman |
| 4,248,209 A | 2/1981 | Wasserman |
| 4,317,047 A | 2/1982 | de Almada |
| 4,364,532 A | 12/1982 | Stark |
| 4,388,805 A | 6/1983 | Rideout, Jr. |
| 4,393,654 A | 7/1983 | Pelly |
| 4,404,490 A | 9/1983 | Taylor et al. |
| 4,423,596 A | 1/1984 | Karnes |
| 4,504,761 A | 3/1985 | Triplett |
| 4,536,674 A | 8/1985 | Schmidt |
| 4,551,978 A | 11/1985 | O'Hare |
| 4,677,248 A * | 6/1987 | Lacey ..................... 134/244 |
| 4,685,296 A | 8/1987 | Burns |
| 4,709,689 A * | 12/1987 | Simcox .................... 126/448 |
| 5,548,177 A | 8/1996 | Carroll |
| 5,552,656 A | 9/1996 | Taylor |
| 5,552,657 A | 9/1996 | Epstein et al. |
| 5,578,889 A | 11/1996 | Epstein |
| 5,621,264 A | 4/1997 | Epstein |
| 5,814,921 A | 9/1998 | Carroll |
| 5,955,790 A | 9/1999 | North |

* cited by examiner

Primary Examiner—Hoang Nguyen
(74) Attorney, Agent, or Firm—Richard M. Goldberg

(57) ABSTRACT

A piezoelectric power generating arrangement activated by elements caused to rotate by a natural energy source, includes a plurality of bristles; a plurality of piezoelectric elements in surrounding relation to and in contact with the bristles; a rotating device for providing rotation of the bristles relative to the piezoelectric elements such that the piezoelectric elements are activated to produce an output in response to engagement of the piezoelectric elements by the bristles during the rotation; and a solar activated bimetallic strip in a tube surrounded by vehicle tires, the bi-metallic strip expanding and contracting in response to solar radiation absorbed by the tires and tube and connected with a rack that meshes with a gear system that rotates the bristles.

18 Claims, 4 Drawing Sheets

US 6,438,957 B1

PIEZOELECTRIC POWER GENERATING ARRANGEMENT ACTIVATED BY ELEMENTS CAUSED TO ROTATE BY NATURAL ENERGY SOURCE

BACKGROUND OF THE INVENTION

The present invention relates generally to energy generating devices, and more particularly, is directed to a piezoelectric power generating arrangement activated by elements caused to rotate by a natural energy source.

In view of the great energy requirements today and the dependence on fossil fuels and the like, there is a great interest in developing inexpensive, non-polluting, energy sources. For this reason, solar energy has become very popular. However, relatively expensive mechanisms must be built to collect the solar energy.

In addition to the need for inexpensive, non-polluting energy sources, another problem today is the great amount of waste dumps that contain such items as automobile tires and the like, which do not decompose over short periods of time.

It would therefore be desirable to use the waste items to help collect the solar energy, thereby overcoming the problem of disposable waste as well as providing energy conservation.

OBJECTS AND SUMMARY OF THE INVENTION

Accordingly, it is an object of the present invention to provide a piezoelectric power generating arrangement activated by elements caused to rotate by a natural energy source, that overcomes the problems with the aforementioned arrangements.

It is another object of the present invention to provide a piezoelectric power generating arrangement controlled by a solar energy activated device that uses vehicle tires to help collect the solar energy.

It is still another object of the present invention to provide a piezoelectric power generating arrangement controlled by expanding and contracting ballonets in a dirigible or large black bags on the earth's surface.

It is yet another object of the present invention to provide a piezoelectric power generating arrangement controlled by increases and decreases in water pressure during descent and ascent of a bathysphere.

It is a further object of the present invention to provide a piezoelectric power generating arrangement that includes a rack and gear system for rotating bristles that activate piezoelectric elements, with the rack being moved by a device controlled by the natural energy source.

In accordance with an aspect of the present invention, a piezoelectric power generating arrangement activated by elements caused to rotate by a natural energy source, includes a plurality of piezoelectric elements; a plurality of bristles arranged adjacent the piezoelectric elements; a rotating device for providing relative rotation between the piezoelectric elements and the bristles such that the piezoelectric elements are activated to produce an output in response to engagement of the piezoelectric elements by the bristles during the relative rotation; and an activated device for controlling the rotating device to provide the relative rotation, in response to a natural energy source.

The rotating device includes a shaft for mounting either the bristles or the piezoelectric elements; at least one gear for rotating the shaft; and a rack controlled by the activated device for movement relative to the at least one gear and in meshing engagement with the at least one gear. The at least one gear includes a first gear driven by the rack; and a second smaller gear in meshing engagement with the first gear so as transfer slow moving, high torque of the first gear to a high rotational speed of the second gear. In one embodiment, the first gear is directly driven by the rack. In another embodiment, there is a third gear in meshing engagement with the rack, with the third gear mounted on a shaft and the first gear is driven on the same shaft as the third gear.

In one embodiment, the activated device includes a bi-metallic element connected with the rotating device and which expands and contracts in response to solar radiation energy. In such case, the activated device further includes a tube; a plurality of solar energy collecting elements in surrounding relation to the tube; and the bimetallic element is positioned in the tube. Further, the rack is connected with the bimetallic element for movement relative to the at least one gear and in meshing engagement with the at least one gear. The solar energy collecting device includes a plurality of rubber vehicle tires in surrounding relation to the tube, with the rubber vehicle tires filled with a dark heat absorbing rock. Also, additional heat absorbing spacer members a provided between adjacent tires, and the spacer members include radially directed fins in contact with the pipe, and the spacer members are filled with a heatable liquid. In a modification, a drainage arrangement is provided for draining the liquid from the spacer members.

In another embodiment, the activated device includes a ballonet in a. dirigible, the ballonet being expandable and contractible in response to solar radiation energy. In such case, the rack is connected with the ballonet for movement relative to the at least one gear and in meshing engagement with the at least one gear.

In still another embodiment, the activated device includes a submergible bathysphere having an end wall that is movable inwardly and outwardly of the bathysphere in response to external water pressure. In such case, the rack is connected with the end wall of the bathysphere for movement relative to the at least one gear and in meshing engagement with the at least one gear.

The above and other objects, features and advantages of the invention will become readily apparent from the following detailed description thereof which is to be read in connection with the accompanying drawings.

DETAILED DESCRIPTION

Figure 1:
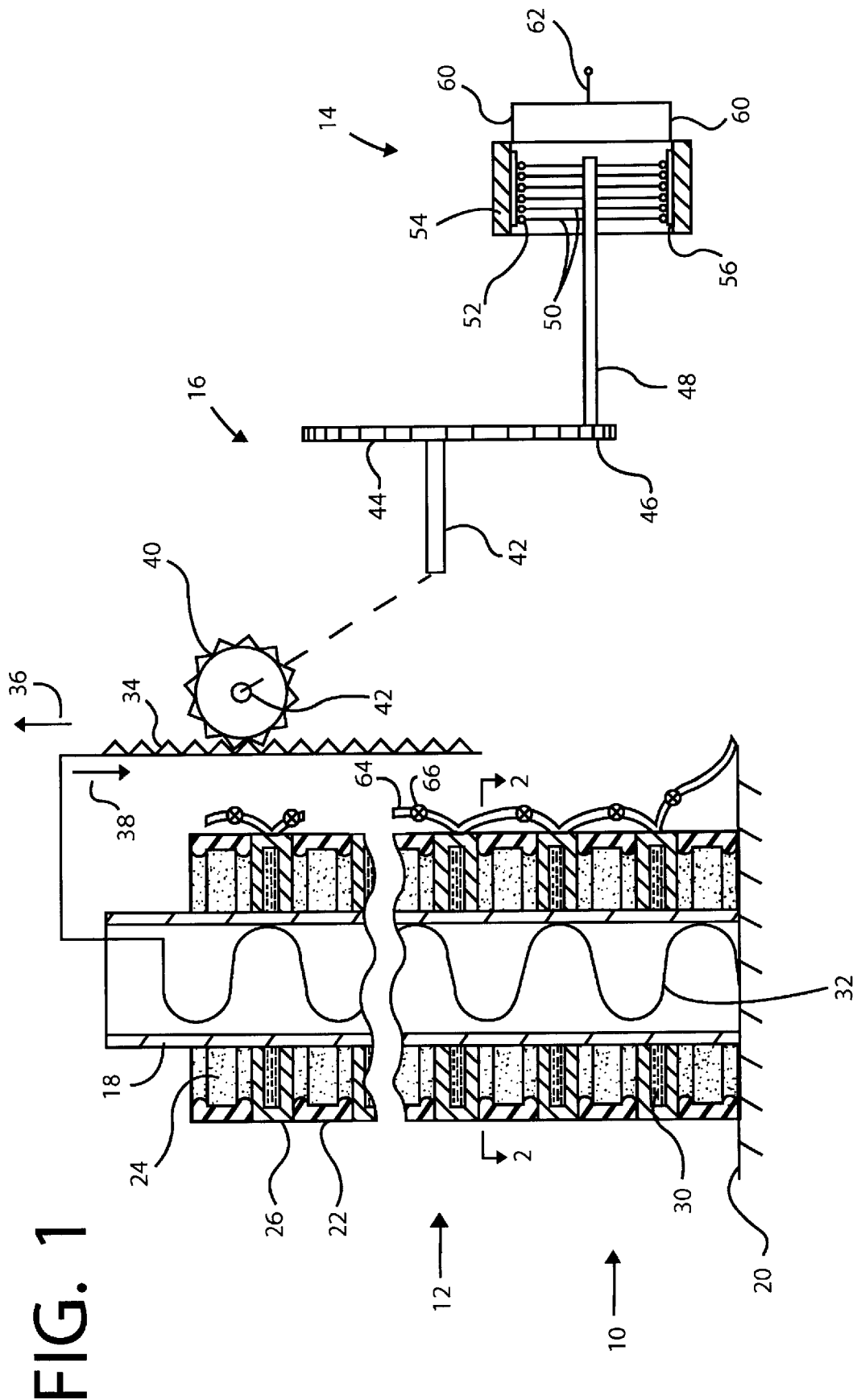
FIG. 1 is a partial cross-sectional, partial schematic view of a piezoelectric power generating arrangement according to a first embodiment of the present invention.

Referring to the drawings in detail, and initially to FIG. 1 thereof, a piezoelectric power generating arrangement 10 controlled by a solar energy activated device according to a first embodiment of the present invention includes a solar energy collecting arrangement 12, a piezoelectric power generator 14 and a piezoelectric actuating device 16 for activating the piezoelectric power generator 14 in response to solar energy collected from solar energy collecting arrangement 12.

Specifically, solar energy collecting arrangement 12 includes an elongated metal pipe 18 which is vertically mounted on a ground surface 20. Metal pipe 18 can have any suitable dimensions, but preferably has a diameter of about 1 foot and a height (length) of about 30 feet. A plurality of rubber automobile tires 22 are stacked on top of each other around and in concentric relation to metal pipe 18. These can be recalled or waste tires that can no longer be used on vehicles. Preferably, there are about twenty such automobile tires 22 in the stacked relation. Preferably, tires 22 are filled with a dark rock 24, such as crushed basalt. In addition, tires 22 are preferably sealed with an epoxy to prevent heat from volatilizing molecules of rubber from the surfaces of tires 22. Because tires 22 and rock 24 have a dark color and are dense, they absorb and hold heat very rapidly from the solar energy.

Figure 2:
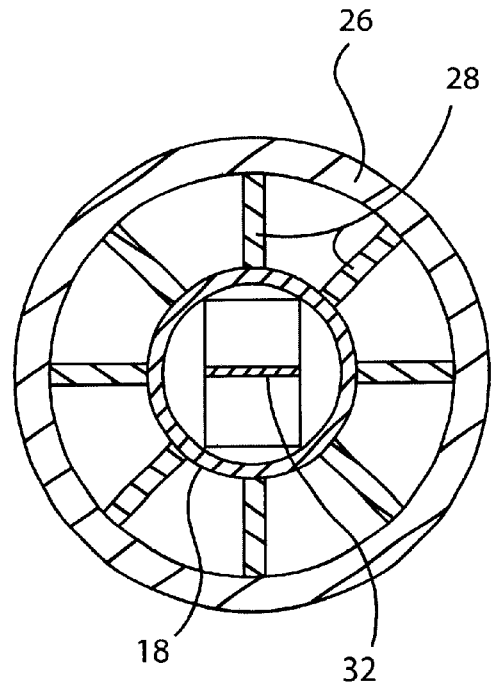
FIG. 2 is a cross-sectional view of the piezoelectric power generating arrangement of FIG. 1, taken along line 2—2 thereof.

Hollow cylindrical spacer members 26 are preferably positioned between adjacent tires 22, with upper and lower surfaces of cylindrical members 26 being closed. As shown best in the cross-section of FIG. 2, cylindrical members 26 preferably include a plurality of radially directed fins 28 which connect cylindrical members 26 to the outer surface of metal pipe 18. The interiors of cylindrical members 26, which are closed at their upper and lower surfaces, contain water 30 therein, that is, between fins 28. Thus, fins 28 conduct heat to water 30 which, in turn, conducts heat to metal pipe 18. Specifically, as tires 22 and basalt 24 are heated, they heat fins 28 and water 30 of the adjacent cylindrical members 26. This heat is transferred to pipe 18.

A bi-metallic strip 32, preferably in the form of a helix or coil, is positioned within pipe 18 and absorbs heat transferred to pipe 18 from the solar heated water and fins 28. Bi-metallic strip 32 expands as pipe 18 is heated, that is, as the sun rises toward its zenith. Preferably, the strip should be in the form of a double helix.

The upper end of bi-metallic strip 32 extends out of pipe 18 and is connected to a rack 34. Thus, as bi-metallic strip 32 expands, rack 34 moves upward vertically in the direction of arrow 36, and as it contracts, it moves downwardly in the direction of arrow 38. A toothed gear 40 is engaged with rack 34, and as a result, the shaft 42 on which toothed gear 40 is mounted, is rotated slowly with the heat of the day, but with much torque. Shaft 42 has a large gear 44 mounted thereon and engages a much smaller gear 46. Because of the gear ratio, the slow moving, high torque of gear 44 is transferred to a high rotational speed of the secondary gear 46.

Figure 3:
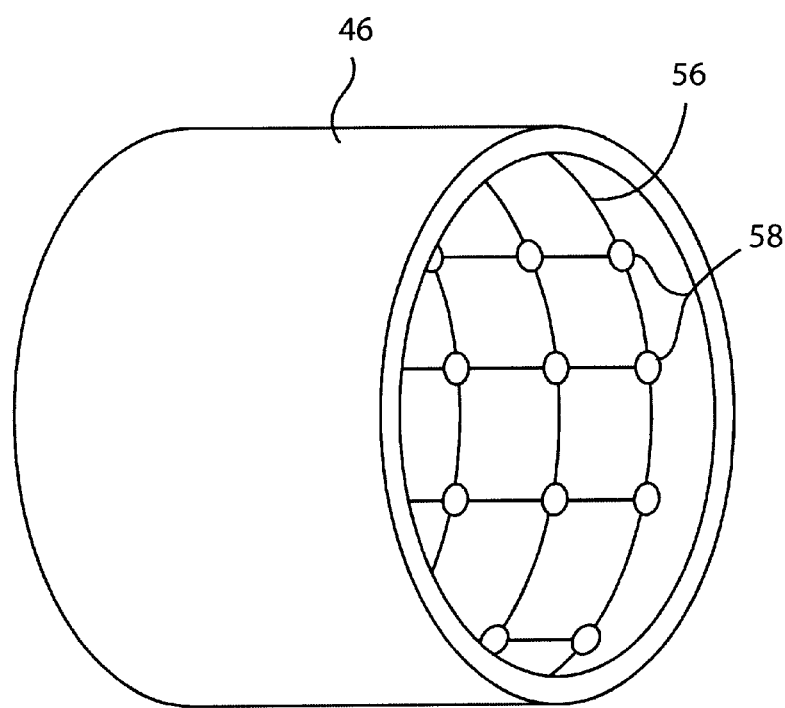
FIG. 3 is a perspective view of the piezoelectric mesh arrangement mounted within the squirrel cage.

Secondary gear 46 is mounted on a shaft 48, and the other end of shaft 48 includes a plurality of bristles 50, which are preferably flexible and in the form of a spring material, each terminating in a friction-reducing ball or roller bearing 52. Bristles 50 and roller bearings 52 are surrounded by a cylindrical squirrel cage 54 having a cylindrical shaped wire mesh arrangement 56 of piezoelectric elements 58 mounted to the inner surface thereof. Mesh arrangement 56 could be set on rails (not shown) in order to oscillate slightly in the axial direction of squirrel cage 54 in order to equalize wear. Mesh arrangement 56 is shown best in FIG. 3, which includes a plurality of piezoelectric elements 58 at the nodes of wire mesh arrangement 56. Separate electrical wires for providing outputs of piezoelectric elements 58 are not shown in FIG. 3. As shaft 48 is turned, bearings 52 at the ends of bristles 50 engage and release piezoelectric elements 58 of mesh 56, causing piezoelectric elements 58 to produce DC electricity. This electricity is output from,piezoelectric elements 58 via wires 60 to a common output wire 62. This output can be used for powering various output devices, such as lamps, etc.

Alternatively, piezoelectric elements 58 can be mounted on the ends of bristles 50 so as to rotate therewith, while bearings 52 are fixed to the inner surface of squirrel cage 54. In other words, it is only important that there be relative rotation between piezoelectric elements 58 and bearings 52.

As a modification, bristles 50 can include magnetic elements as part of bearings 52, and in such case, there would then be a rotating magnetic field inside the conductive wires of mesh 56, which is essentially an AC dynamo, and which could be used to provide an AC output.

In a preferred embodiment, a plurality of piezoelectric power generating arrangements 10 would be installed on a south-facing hillside in a row so that they could all supply current to a motor for turning a common primary shaft. In this manner, individual torque production would be additive. Preferably, natural or constructed features, such as banks or snow or reflective-roofs, would enhance the effectiveness of the transfer of solar radiation and heat to piezoelectric power generating arrangements 10.

As a preferred embodiment, the arrangements would be spaced five to six feet apart. This would provide twenty thousand tires per linear mile, one million tires per fifty miles, and the twenty million tires in the Firestone tire recall would equal one thousand miles. There are approximately three million tires alone in California due to this recall, equaling one hundred fifty linear miles.

As an alternative embodiment, rather than using the energy from the cooling, that is, retraction of bimetallic strip 32, heat held by the water 30 could be transferred via tubes 64 for use in direct heating of greenhouses or the like at night. Specifically, by way of valves 66 connected with tubes 64, water 30 could be drained from cylindrical members 26 to flow under a greenhouse and thereby heat the same at night. Water 30 would be refilled into cylindrical members 26 during the morning hours to permit the solar radiation to once again heat the water, or alternatively, the water from under the greenhouse could be recirculated by a pump (not shown) back to cylindrical members 26, whereupon valves 66 would then be closed in sequence as cylindrical members 26 are filled.

Figure 4:
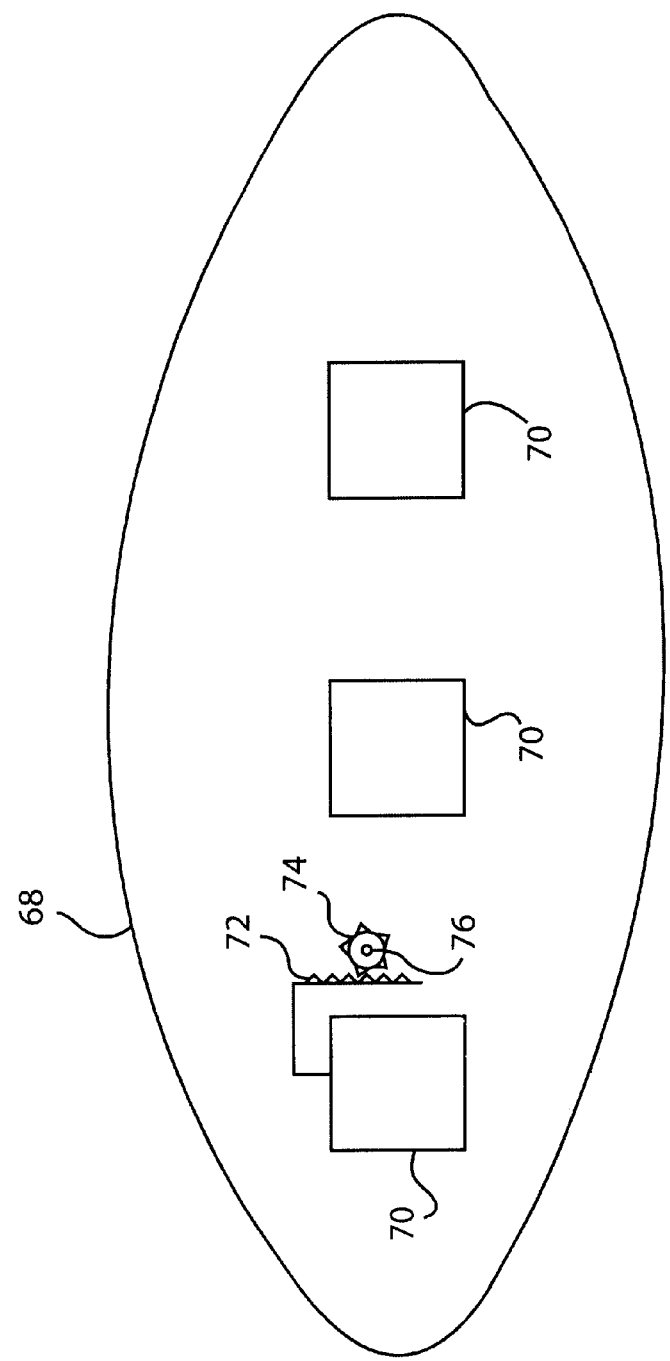
FIG. 4 is a schematic view of a dirigible utilizing the present invention.

The present invention has many other applications. For example, the present invention can also be used with dirigibles or blimps 68, as shown in FIG. 4. In such case, ballonets 70, which are known gas containers that are connected with the framework of the dirigibles 68 and which can be inflated or deflated during flight, are provided for maintaining the same airborne. A problem has always occurred that ballonets 70 routinely expand and contract with solar heat, which is generally undesirable. However, the same basic principle of the rack system of FIG. 1 can be used with ballonets 68. Specifically, as ballonets expand, a rack 72 which is connected to, for example, the upper surface of each ballonet 68, will rise and thereby move rack 72 therewith. As a result, the expansion of ballonets 70 can be used for recovering energy in the same manner as in the embodiment of FIG. 1, that is, to rotate a toothed gear 74 mounted on a shaft 76, which can then be used for actuating piezoelectric elements (not shown) in the same manner as discussed above in relation to FIGS. 1–3. The difference, however, is that the expansion and contraction of ballonets 70 due to solar energy would cause movement of rack 72, while movement of rack 34 in the embodiment of FIG. 1 is caused by expansion. and contraction of bi-metallic element 32 due to solar energy.

Alternatively, the same principles can be applied to large black bags on the earth's surface, in place of the ballonets.

Figure 5:
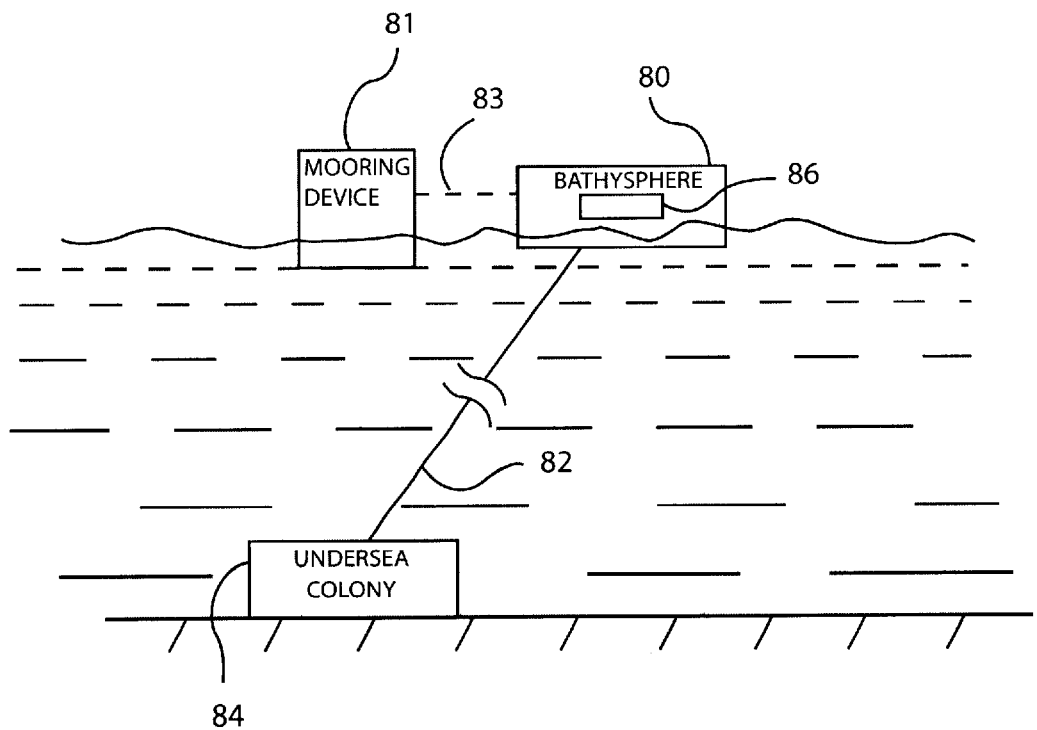
FIG. 5 is a schematic view of a bathysphere utilizing the present invention.

As a further application, the present invention can be used with a bathysphere. Specifically, a bathysphere can be used to carry cargo from the surface of a body of water to an undersea colony on the ocean floor, as shown in FIG. 5. In such case, a plurality of bathyspheres 80, which are self-buoyant, are connected by a cable 82 extending from the undersea colony 84 to the surface of the body of water. Each bathysphere 80 can ride along a respective cable 82 to undersea colony 84 and back. In this regard, each cable 82 provides directional control for bathyspheres 80, as well as communication between each bathysphere 80 and undersea colony 84.

As cargo is loaded on a bathysphere 80, the respective bathysphere 80 is prevented by suitable moorings 83 attached to a buoyant mooring device 81 from sinking until the desired weight of cargo is reached. When the desired weight of cargo is reached, bathysphere 80 casts off from its moorings and rides cable 82 down to undersea colony 84. At undersea colony 84, bathysphere 80 is moored, and the cargo removed. The moorings are then cast off, and the now-buoyant bathysphere 80 rides cable 82 back to the surface of the body of water.

Figure 6:
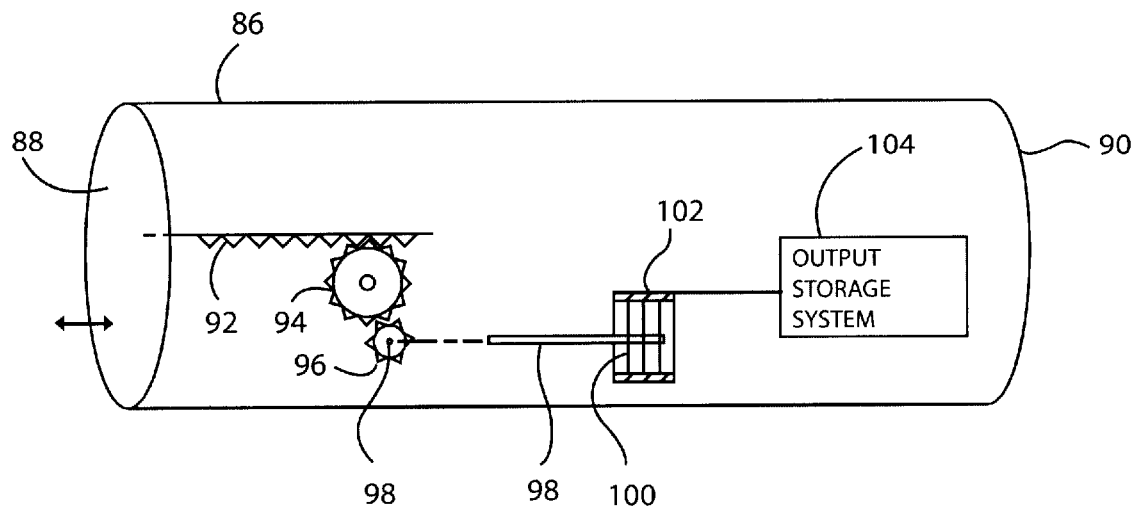
FIG. 6 is a schematic view of a compression cylinder mounted to the bathysphere.

As shown in FIG. 5, a compression cylinder 86 is attached to the outer surface of the hull of bathysphere 80. Referring to FIG. 6, compression cylinder 86 is shown in more detail, and compression cylinder 86 is closed at both ends by end plates 88 and 90. However, end plate 88 can move in or out in accordance with pressure fluctuations as bathysphere 80 ascends and descends. For example, end plate 88 can have inner sealing projections (not shown) which ride within grooves (not shown) in the inner surface of compression cylinder 86. Further, end plate 88 is preferably spring loaded to the outside by a suitable internal spring (not shown). A toothed rack 92 is connected with the inner surface of end plate 88 and extends axially within compression cylinder 86. As end plate 88. moves in and out of compression cylinder 86, toothed rack 92 engages and rotates a primary gear 94, which is also in meshing engagement with a secondary gear 96. Because secondary gear 96 is much smaller than primary gear 94, secondary gear will rotate at a much high speed than primary gear 94.

Secondary gear 96 is mounted on a shaft 98 containing bristles 100, so that bristles 100 are rotated by secondary gear 96 and shaft 98. A cylindrical mesh 102 of piezoelectric elements surrounds bristles 100, so that the piezoelectric elements are struck and activated by bristles 100, to provide an output current that is supplied to an energy storage system 104, such as batteries or pressurized gases electrolycized from sea water.

Thus, as the loaded bathysphere 80 sinks down and rides along cable 82, the increasing water pressure will force end plate 88 into the interior of compression cylinder 86. Toothed rack 92 will thus move and thereby rotate primary gear 94 which, in turn, rotates secondary gear 96. This causes shaft 98 and bristles 100 to rotate, thereby activating the piezoelectric elements, providing energy to energy storage system 104, in proportion to the rate of descent of bathysphere 80. At undersea colony 84, the energy stored in energy storage system 104 is removed for undersea use, along with the cargo in bathysphere 80. Then, with positive buoyancy, bathysphere 80 rides up to the surface of the body of water along cable 82. The decreasing water pressure causes end plate 88 to move outwardly, thus providing reverse movement of toothed rack 92, primary gear 94, secondary gear 96 and shaft 98, again producing a DC output during the ascent as well and/or reverse AC current.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention defined by the appended claims.

What is claimed is:

1. A piezoelectric power generating arrangement activated by elements caused to rotate by a natural energy source, comprising:
    a plurality of piezoelectric elements;
    a plurality of contact elements arranged adjacent said piezoelectric elements;
    a rotating device for providing relative rotation between said piezoelectric elements and said contact elements such that said contact elements periodically apply and release pressure on said piezoelectric elements and said piezoelectric elements are activated to produce an output in response to said periodic engagement of said piezoelectric elements by said contact elements during said. relative rotation; and
    an activated device for controlling said rotating device to provide said relative rotation, in response to a natural energy source.

2. A piezoelectric power generating arrangement activated by elements caused to rotate by a natural energy source, comprising:
    a plurality of piezoelectric elements;
    a plurality of contact elements arranged adjacent said piezoelectric elements;
    a rotating device for providing relative rotation between said piezoelectric elements and said contact elements such that said piezoelectric elements are activated to produce an output in response to engagement of said piezoelectric elements by said contact elements during said relative rotation, said rotating device including:
        a shaft for mounting one of:
            said contact elements, and
            said piezoelectric elements;
        at least one gear for rotating said shaft; and
        a rack controlled by said activated device for movement relative to said at least one gear and in meshing engagement with said at least one gear; and
    an activated device for controlling said rotating device to provide said relative rotation, in response to a natural energy source.

3. A piezoelectric power generating arrangement according to claim 2, wherein said at least one gear includes:
    a first gear driven by said rack; and
    a second smaller gear in meshing engagement with said first gear so as transfer slow moving, high torque of the first gear to a high rotational speed of the second gear.

4. A piezoelectric power generating arrangement according to claim 3, wherein said first gear is directly driven by said rack.

5. A piezoelectric power generating arrangement according to claim 3, further comprising a third gear in meshing engagement with said rack, said third gear mounted on a shaft and said first gear is driven on the same shaft as said third gear.

6. A piezoelectric power generating arrangement activated by elements caused to rotate by a natural energy source, comprising:

a plurality of piezoelectric elements;

a plurality of contact elements arranged adjacent said piezoelectric elements;

a rotating device for providing relative rotation between said piezoelectric elements and said contact elements such that said piezoelectric elements are activated to produce an output in response to engagement of said piezoelectric elements by said contact elements during said relative rotation; and an activated device for controlling said rotating device to provide said relative rotation, in response to a natural energy source, said activated device including a bi-metallic element connected with said rotating device and which expands and contracts in response to solar radiation energy.

7. A piezoelectric power generating arrangement according to claim 6, wherein said activated device further includes:
a tube;
a plurality of solar energy collecting elements in surrounding relation to said tube; and
said bi-metallic element is positioned in said tube.

8. A piezoelectric power generating arrangement according to claim 7, wherein said rotating device includes:

a shaft for mounting one of:
said contact elements, and
said piezoelectric elements;
at least one gear for rotating said shaft; and
a rack connected with said bi-metallic element for movement relative to said at least one gear and in meshing engagement with said at least one gear.

9. A piezoelectric power generating arrangement according to claim 7, wherein said solar energy collecting device includes a plurality of rubber vehicle tires in surrounding relation to said tube.

10. A piezoelectric power generating arrangement according to claim 9, wherein said rubber vehicle tires are filled with a dark heat absorbing rock.

11. A piezoelectric power generating arrangement according to claim 9, wherein said solar energy collecting device further includes additional heat absorbing spacer members between adjacent tires.

12. A piezoelectric power generating arrangement according to claim 11, wherein said spacer members include radially directed fins in contact with said pipe, and said spacer members are filled with a heatable liquid.

13. A piezoelectric power generating arrangement according to claim 11, further including a drainage arrangement for draining said liquid from said spacer members.

14. A piezoelectric power generating arrangement activated by elements caused to rotate by a natural energy source, comprising:

a plurality of piezoelectric elements;

a plurality of contact elements arranged adjacent said piezoelectric elements;

a rotating device for providing relative rotation between said piezoelectric elements and said contact elements such that said piezoelectric elements are activated to produce an output in response to engagement of said piezoelectric elements by said contact elements during said relative rotation; and an activated device for controlling said rotating device to provide said relative rotation, in response to a natural energy source, said activated device including a ballonet in a dirigible, said ballonet being expandable and contractible in response to solar radiation energy.

15. A piezoelectric power generating arrangement according to claim 14, wherein said rotating device includes:

a shaft for mounting one of:
said contact elements, and
said piezoelectric elements;
at least one gear for rotating said shaft; and
a rack connected with said ballonet for movement relative to said at least one gear and in meshing engagement with said at least one gear.

16. A piezoelectric power generating arrangement activated by elements caused to rotate by a natural energy source, comprising:

a plurality of piezoelectric elements;

a plurality of contact elements arranged adjacent said piezoelectric elements;

a rotating device for providing relative rotation between said piezoelectric elements and said contact elements such that said piezoelectric elements are activated to produce an output in response to engagement of said piezoelectric elements by said contact elements during said relative rotation; and an activated device for controlling said rotating device to provide said relative rotation, in response to a natural energy source, said activated device including a submergible bathysphere having an end wall that is movable inwardly and outwardly of said bathysphere in response to external water pressure.

17. A piezoelectric power generating arrangement according to claim 16, wherein said rotating device includes:

a shaft for mounting one of:
said contact elements, and
said piezoelectric elements;
at least one gear for rotating said shaft; and
a rack connected with said end wall of said bathysphere for movement relative to said at least one gear and in meshing engagement with said at least one gear.

18. A piezoelectric power generating arrangement according to claim 1, wherein said contact elements periodically impact against said piezoelectric elements to apply and release said pressure on said piezoelectric elements.

* * * * *